(12) United States Patent
Kadoi

(10) Patent No.: US 11,505,064 B2
(45) Date of Patent: Nov. 22, 2022

(54) PEDAL DEVICE FOR VEHICLE

(71) Applicant: TOYOTA JIDOSHA KABUSHIKI KAISHA, Toyota (JP)

(72) Inventor: Hironori Kadoi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/532,223

(22) Filed: Nov. 22, 2021

(65) Prior Publication Data

US 2022/0176815 A1 Jun. 9, 2022

(30) Foreign Application Priority Data

Dec. 8, 2020 (JP) .............................. JP2020-203479

(51) Int. Cl.
| | |
|---|---|
| *G05G 1/30* | (2008.04) |
| *B60K 26/02* | (2006.01) |
| *B60T 7/06* | (2006.01) |

(52) U.S. Cl.
CPC ................ *B60K 26/02* (2013.01); *B60T 7/06* (2013.01)

(58) Field of Classification Search
CPC .. G05G 1/30; G05G 1/36; G05G 1/44; G05G 1/445; G05G 1/38
See application file for complete search history.

(56) References Cited

U.S. PATENT DOCUMENTS

| | | | | |
|---|---|---|---|---|
| 9,481,334 | B1 * | 11/2016 | Matsumoto | ............. B60R 19/34 |
| 10,013,016 | B2 * | 7/2018 | Fuller | ...................... G05G 1/46 |
| 2005/0217410 | A1 * | 10/2005 | Sakuraba | .................. G05G 1/30 74/513 |
| 2009/0293666 | A1 * | 12/2009 | Kim | ........................ B60K 26/02 74/513 |
| 2010/0319480 | A1 * | 12/2010 | Nebuya | ..................... G05G 1/44 74/513 |
| 2012/0279346 | A1 * | 11/2012 | Canavan | ................ G05G 1/405 74/513 |
| 2014/0305256 | A1 * | 10/2014 | Fuller | ...................... G05G 1/44 248/314 |

(Continued)

FOREIGN PATENT DOCUMENTS

| | | |
|---|---|---|
| JP | 2006-335352 A | 12/2006 |
| JP | 2011-243165 A | 12/2011 |

(Continued)

*Primary Examiner* — Brian J Mcgovern

(74) *Attorney, Agent, or Firm* — Dinsmore & Shohl LLP

(57) ABSTRACT

A pedal device for a vehicle includes: a pedal pad; a single reference hole formed in one of a base member and a supporting member comprising at least one of a panel or a bracket; a through-hole for fixing that is formed in the base member; a reference shaft member that is supported by the other of the base member or the supporting member, and is inserted into the reference hole while forming a first clearance between the reference shaft member and the reference hole, and whose extension line intersects the pedal pad; and a shaft member for fixing that is inserted into the through-hole for fixing while forming a second clearance that is larger than the first clearance between the shaft member for fixing and the through-hole for fixing, and that fixes the base member to the supporting member by being fixed to the supporting member.

8 Claims, 21 Drawing Sheets

(56) References Cited

U.S. PATENT DOCUMENTS

| | | | |
|---|---|---|---|
| 2014/0338492 A1* | 11/2014 | Yokoi | G05G 1/30 |
| | | | 74/513 |
| 2016/0318552 A1* | 11/2016 | Matsumoto | B60R 19/34 |
| 2017/0090504 A1* | 3/2017 | Kadoi | G05G 1/483 |
| 2017/0240044 A1* | 8/2017 | Tabata | G05G 1/44 |
| 2019/0160943 A1 | 5/2019 | Kadoi | |

FOREIGN PATENT DOCUMENTS

| | | |
|---|---|---|
| JP | 2015-033925 A | 2/2015 |
| JP | 2019-096253 A | 6/2019 |

\* cited by examiner

PEDAL DEVICE FOR VEHICLE

CROSS-REFERENCE TO RELATED APPLICATION

This application is based on and claims priority under 35 USC 119 from Japanese Patent Application No. 2020-203479 filed on Dec. 8, 2020, the disclosure of which is incorporated by reference herein.

BACKGROUND

Technical Field

The present disclosure relates to a pedal device for a vehicle.

Related Art

The pedal device for a vehicle of Japanese Patent Application Laid-Open (JP-A) No. 2015-33925 includes a brake pedal and an accelerator pedal. The brake pedal is rotatably supported by a dash panel. The brake pedal includes a brake pedal pad that is stepped-on by the driver. A base member is fixed to a bracket that is fixed to a floor panel, and the lower end portion of the accelerator pedal pad is rotatably supported by the base member. Namely, the accelerator pedal is an organ type accelerator pedal.

At the time of fixing the base member to the bracket, typically, first, the base member is temporarily fixed to the bracket by two bolts that are inserted into two through-holes that are formed in the base member. Namely, the screw portions of the two bolts are inserted into female screw holes of the bracket, and the head portions of the respective bolts are set in a state of being apart from the base member. Then, the insertion amount of the respective bolts in the female screw holes is increased, and the head portions of the bolts press-contact the base member. Due thereto, the base member is fixed to the bracket by the two bolts.

In the technique disclosed in JP-A No. 2015-33925, clearances are formed between the two through-holes and the respective bolts. Therefore, at the time when the base member is temporarily fixed to the bracket, the base member can move relatively to the bracket within the range of the aforementioned clearances. Therefore, there is the concern that, at the time when the base member is fixed to the bracket, the relative position of the base member and the accelerator pedal pad with respect to the bracket may be offset from the designed position.

SUMMARY

In view of the above-described circumstances, an object of the present disclosure is to provide a pedal device for a vehicle that can fix a base member, which rotatably supports an accelerator pedal pad of an organ type accelerator pedal, to a supporting member such that the position of a predetermined region of the accelerator pedal pad is not greatly offset from the designed position.

A pedal device for a vehicle according to a first aspect of the present disclosure includes: a base member that is supported by a supporting member comprising at least one of a panel, which structures an inner wall of an interior space of a vehicle, or a bracket that is fixed to the panel; and an accelerator pedal pad of an organ type accelerator pedal that is rotatably supported by the base member, wherein a single reference hole is formed in one of the supporting member or the base member, at least one through-hole for fixing is formed in the base member, a reference shaft member, which is inserted into the reference hole while forming a predetermined first clearance between the reference shaft member and an inner peripheral surface of the reference hole and whose extension line, which extends along an extending direction of the reference shaft member, intersects the accelerator pedal pad, is supported by the other of the supporting member or the base member, and a shaft member for fixing, which is inserted into the through-hole for fixing while forming a second clearance that is larger than the first clearance between the shaft member for fixing and an inner peripheral surface of the through-hole for fixing, fixes the base member to the supporting member by being fixed to the supporting member.

In the pedal device for a vehicle according to the first aspect of the present disclosure, the single reference hole is formed in one of the supporting member, which is at least one of a panel structuring an inner wall of an interior space of the vehicle or a bracket that is fixed to the panel, and a base member that rotatably supports the accelerator pedal pad. Moreover, the reference shaft member is supported by the other of the supporting member or the base member. The reference shaft member is inserted into the reference hole while forming the first clearance between the reference shaft member and the inner peripheral surface of the reference hole.

The first clearance is smaller than the second clearance that is formed between the shaft member for fixing and the at least one through-hole for fixing that is formed in the base member. Therefore, when the base member is not fixed to the supporting member by the shaft portion for fixing, the base member can rotate relative to the supporting member within the range of the second clearance, with the center of rotation thereof being the reference shaft member that is inserted into the reference hole. Therefore, when plural base members are fixed to plural supporting members respectively by shaft members for fixing, there is a possibility that dispersion will arise in the relative positions of the respective accelerator pedal pads with respect to the respective supporting members.

However, an extension line which extends along the extending direction of the reference shaft member intersects the accelerator pedal pad. Therefore, even if the base member is rotated relative to the supporting member within the range of the second clearance, the position of the region, which intersects the extension line, of the accelerator pedal pad is substantially unchanged. Accordingly, if the reference shaft member is supported by the other member such that the extension line intersects a predetermined region of the accelerator pedal pad, the position of the aforementioned predetermined region is not greatly offset from the designed position. Therefore, the base member can be fixed to the supporting member such that the driver can easily operate the accelerator pedal.

A pedal device for a vehicle according to a second aspect of the present disclosure includes a suspended type brake pedal that includes a bracket pedal pad rotatably supported by the panel, wherein the extension line overlaps with the brake pedal pad when viewed in a vehicle width direction.

In the second aspect of the present disclosure, when viewed in the vehicle width direction, the extension line of the reference shaft member overlaps with the brake pedal pad. Therefore, the driver can easily operate the accelerator pedal pad and the brake pedal pad by one foot.

In a pedal device for a vehicle according to a third aspect of the present disclosure, the reference shaft member comprises a reference pin that is inserted into the reference hole.

In the third aspect of the present disclosure, the work of mounting the base member to the supporting member by using the reference shaft member is carried out easily, as compared with a case in which the reference shaft member is a bolt or a rivet.

In a pedal device for a vehicle according to a fourth aspect of the present disclosure, the other member and the reference pin are fixed to one another.

In the fourth aspect of the present disclosure, work for supporting the reference pin by the other member is unnecessary. Therefore, the work of fixing the base member to the supporting member is easy.

In a pedal device for a vehicle according to a fifth aspect of the present disclosure, the other member is the base member, and the base member and the reference pin are an integrally molded component made of resin.

In the fifth aspect of the present disclosure, because the base member and the reference pin are an integrally molded component that is made of resin, the number of parts of the pedal device for a vehicle can be reduced.

In a pedal device for a vehicle according to a sixth aspect of the present disclosure, the reference pin is supported by the base member, the reference hole that is formed in the supporting member is a through-hole, and the reference pin includes a retainer claw that is configured to pass through the reference hole from the base member side and that faces the base member while being positioned further toward an outer peripheral side than the reference hole when having been passed through the reference hole.

In the sixth aspect of the present disclosure, when the reference pin has passed through the reference hole from the base member side, the retainer claw faces the base member while being positioned further toward the outer peripheral side than the reference hole. Therefore, the reference pin that is supported by the base member can be easily inserted into the reference hole that is formed in the supporting member, so as to not come out of the reference hole.

In a pedal device for a vehicle according to a seventh aspect of the present disclosure, the through-hole for fixing is an elongated hole, and a longitudinal direction of the elongated hole is a direction that extends along a circumferential direction that is centered on the reference shaft member.

In the seventh aspect of the present disclosure, the second clearance, which extends along the circumferential direction that is centered on the reference shaft member, can be formed between the through-hole for fixing, which is the elongated hole, and the shaft member for fixing. In a case in which such the second clearance is formed, there is no need to make the clearance, which is in the direction orthogonal to the circumferential direction and is formed between the through-hole for fixing and the shaft member for fixing, be the same size as the second clearance. Namely, the clearance in the direction orthogonal to the circumferential direction can be made to be smaller than the second clearance. Accordingly, the area of the through-hole for fixing that is the elongated hole can be made to be smaller than the area of the through-hole for fixing that is a round hole. Therefore, the mechanical strength of the base member can be increased as compared with a case in which the through-hole for fixing is a round hole.

A pedal device for a vehicle according to an eighth aspect of the present disclosure includes: a moving body that controls an operation state of a drive source of the vehicle by moving; and a pushing member that is provided at a surface, which is at a base member side of a predetermined region of the accelerator pedal pad, so as to extend toward the base member side, and that moves the moving body in conjunction with rotation of the accelerator pedal pad, wherein the extension line intersects the predetermined region.

In the eighth aspect of the present disclosure, the extension line of the reference shaft member intersects a predetermined region, which is the region at which the pushing member is provided, of the accelerator pedal pad. Therefore, the position of this predetermined region is not greatly offset from the designed position.

Moreover, when the driver applies force to the predetermined region of the accelerator pedal pad by his/her foot, this force is transmitted efficiently from the predetermined region to the moving body. Therefore, due to the driver pushing the predetermined region by his/her foot, the operation state of the drive source can be controlled by a small force.

As described above, the pedal device for a vehicle according to the present disclosure includes the excellent effect that a base member, which rotatably supports an accelerator pedal pad of an organ type accelerator pedal, can be fixed to a supporting member such that the position of a predetermined region of the accelerator pedal pad is not greatly offset from the designed position.

DETAILED DESCRIPTION

An embodiment of a pedal device 10 for a vehicle according to the present disclosure are described hereinafter with reference to the drawings. Note that an arrow UP that is shown in the respective drawings indicates the upper side in the vehicle vertical direction, an arrow FR indicates the front side in the vehicle longitudinal direction, and an arrow LH indicates the left side in the vehicle left-right direction (the vehicle width direction). Vertical direction, longitudinal direction and left-right direction in the following description mean the vehicle vertical direction, the vehicle longitudinal direction, and the vehicle left-right direction, respectively.

Figure 1:
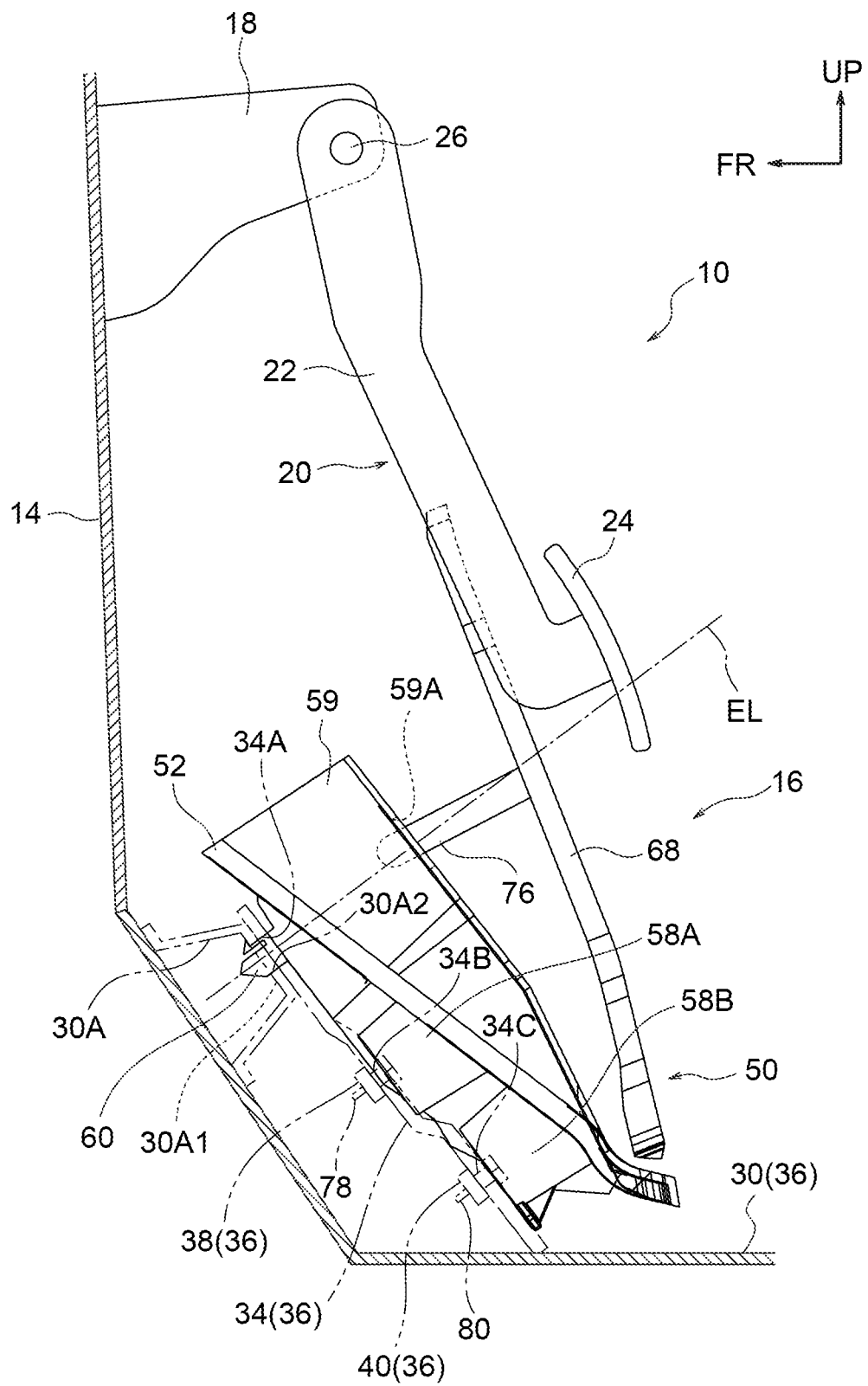
FIG. 1 is a cross-sectional view, which is cut along a plane orthogonal to a vehicle width direction, of a pedal device for a vehicle according to a present embodiment and a portion of a vehicle body.

As shown in FIG. 1, a portion of a body shell, which is made of metal and structures a vehicle body of a vehicle includes the pedal device 10 for a vehicle (hereinafter called pedal device 10), is structured by a dash panel (panel) 14 that is formed from a metal sheet. An engine room (not illustrated) is formed in front of the dash panel 14, and a cabin 16 is formed at the rear of the dash panel 14. A pedal bracket 18 is fixed to the dash panel 14.

A suspended type brake pedal 20 is supported by the pedal bracket 18. The brake pedal 20 includes an arm 22 that is elongated, and a brake pedal pad 24 that is provided at the lower end portion of the arm 22. The upper end portion of the arm 22 is rotatably supported by the pedal bracket 18 via a rotating shaft 26 that extends in the vehicle width direction. The brake pedal 20 is urged to rotate counterclockwise in FIG. 1 by an urging device (not illustrated). Moreover, a stopper (not illustrated), which restricts the counterclockwise rotation of the brake pedal 20 at the initial position shown in FIG. 1, is provided in the vehicle. Therefore, when the driver takes his/her foot off the brake pedal pad 24, the brake pedal 20 is positioned at the initial position. Note that, "foot" in the present specification is the portion of the body that is positioned further toward the distal end side than the ankle. Further, "foot" means a shoe in a case in which the driver is wearing shoes.

When the driver depresses the brake pedal pad 24 toward the front side with his/her foot, a brake booster (not illustrated) operates, and braking force reaches the respective wheels (not illustrated) from the respective braking devices (not illustrated) that are provided at the vehicle. When the driver takes foot his/her foot off the brake pedal pad 24, the brake pedal 20 returns back to the initial position, and the braking force that reached the respective wheels from the respective braking devices disappears.

Figure 6:
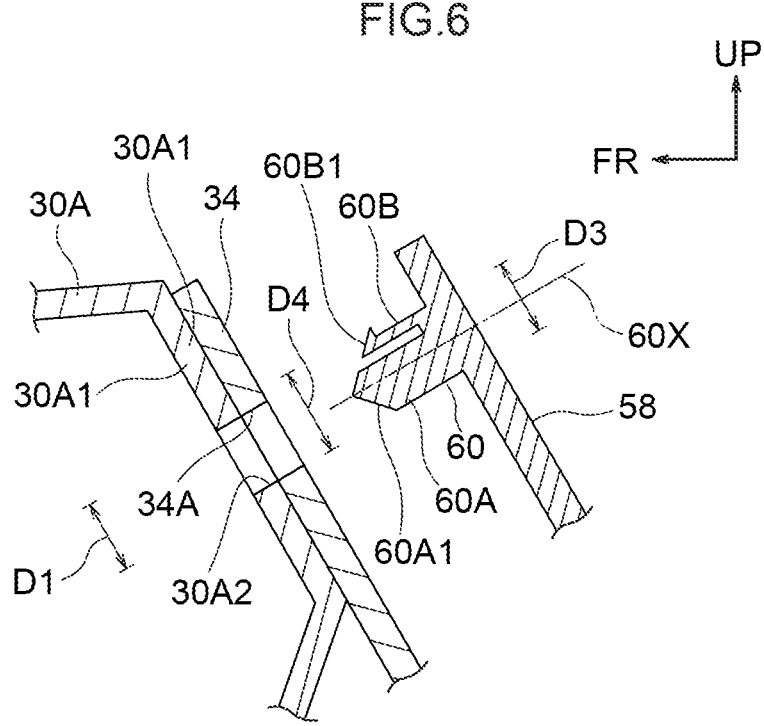
FIG. 6 is a cross-sectional view, which is cut at a position of a reference hole, of a base member of the accelerator pedal device and a supporting member that is apart from the base member, wherein the base member and the supporting member are shown in FIG. 3.
Figure 7:
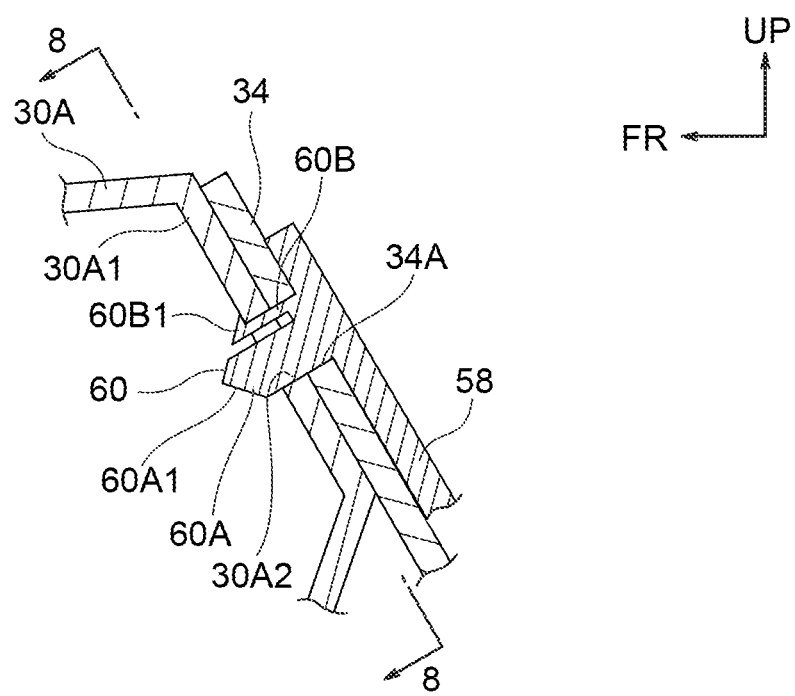
FIG. 7 is a cross-sectional view that is similar to FIG. 6 when a reference pin of the base member shown in FIG. 6 is inserted into the reference hole of the supporting member.

A portion of the body shell is structured by a floor panel (panel) 30 that is formed from a metal sheet. The front end portion of the floor panel 30 is connected to the lower end portion of the dash panel 14. As shown in FIG. 1, the floor panel 30 includes a pedestal portion 30A whose cross-sectional shape orthogonal to the vehicle width direction is substantially trapezoidal. As shown in FIG. 1, FIG. 6 and FIG. 7, a reference hole 30A2 that is circular is formed in an upper plate portion 30A1 that structures the upper end portion of the pedestal portion 30A.

As shown in FIG. 1, a bracket 34 that is made of metal is fixed to the upper surface of the floor panel 30. The bracket 34 is not a flat plate, and has plural steps. The front end portion of the bracket 34 is fixed to the upper plate portion 30A1. The rear end portion of the bracket 34 is fixed to a region of the floor panel 30. This region is positioned further toward the rear than the pedestal portion 30A. As shown in FIG. 1, FIG. 6 and FIG. 7, a reference hole 34A is formed in the front end portion of the bracket 34. This reference hole 34A is a round hole that has the same diameter as and is coaxial with the reference hole 30A2 of the pedestal portion 30A. The inner diameters of the reference hole 30A2 and the reference hole 34A are D1.

Figure 9:
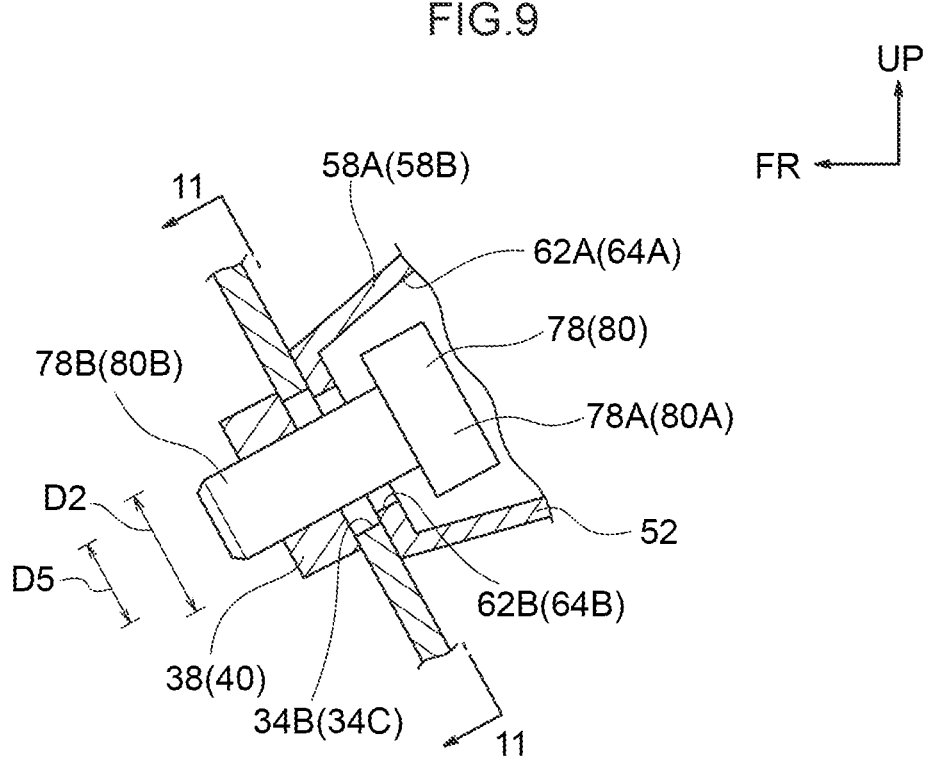
FIG. 9 is a cross-sectional view, which is cut at a position of a through-hole for fixing, of the base member of the accelerator pedal device and the supporting member that is apart from the base member, wherein the base member and the supporting member are shown in FIG. 3.
Figure 10:
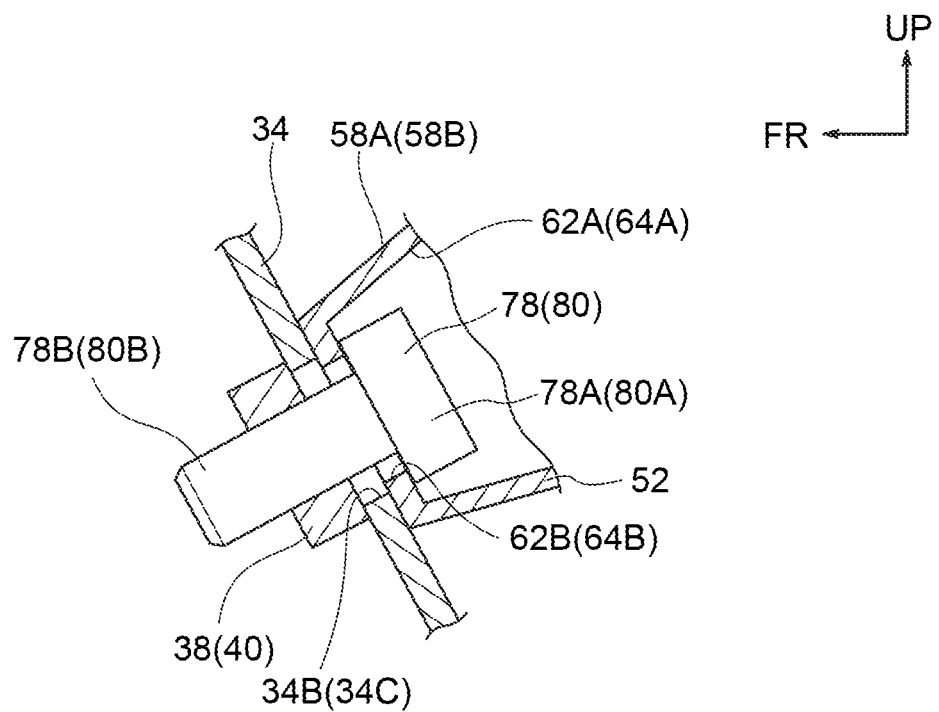
FIG. 10 is a cross-sectional view that is similar to FIG. 9 when the base member and the supporting member shown in FIG. 9 are fixed together by a bolt for fixing.

As shown in FIG. 1, FIG. 9 and FIG. 10, two through-holes 34B, 34C that are lined up in the longitudinal direction are formed in the left side edge portion of the bracket 34. The through-holes 34B, 34C are positioned further toward the left side and the rear side (the lower side) than the reference hole 34A. Two weld nuts 38, 40, which are coaxial with the through-holes 34B, 34C, respectively, are fixed to the lower surface of the bracket 34. The floor panel 30, the bracket 34 and the weld nuts 38, 40 are structural elements of a supporting member 36.

An organ type accelerator pedal device 50 is mounted to the bracket 34. As shown in FIG. 1 through FIG. 5, the accelerator pedal device 50 includes a base member 52, a reference pin (reference shaft member) 60, an accelerator pedal pad 68 (hereinafter, pedal pad 68), a bolt for fixing 78, and a bolt for fixing 80.

The base member 52 is an integrally molded member that is made of resin and includes a supporting portion 54, a fixed portion 58, a case portion 59 and a reference pin 60.

The supporting portion 54 is provided at the rear end portion (lower end portion) of the base member 52. The lower end portion of the pedal pad 68 is connected to the supporting portion 54 so as to be able to rotate around an axis that extends along the left-right direction.

Figure 2:
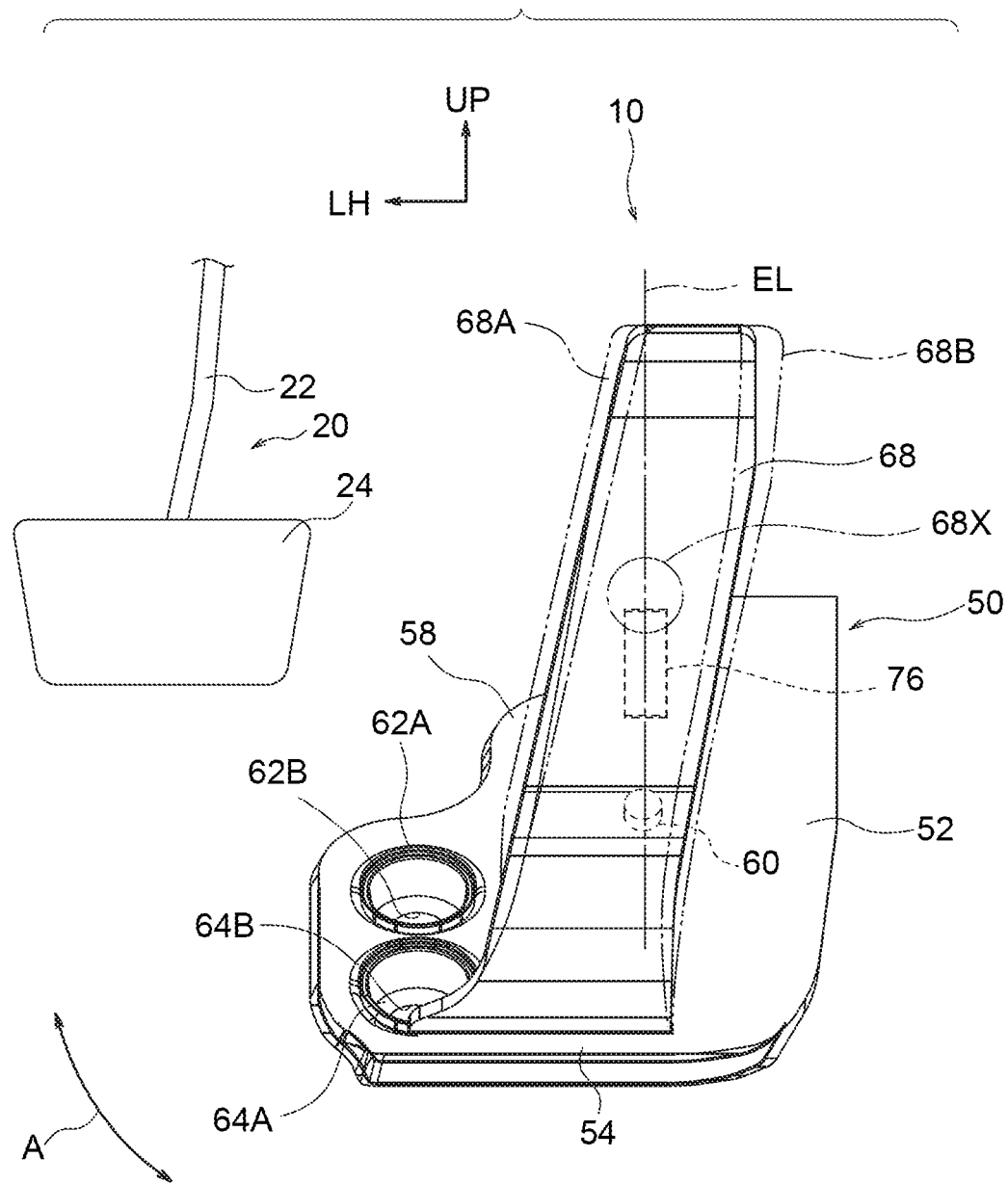
FIG. 2 is a rear view of the pedal device for a vehicle shown in FIG. 1.
Figure 3:
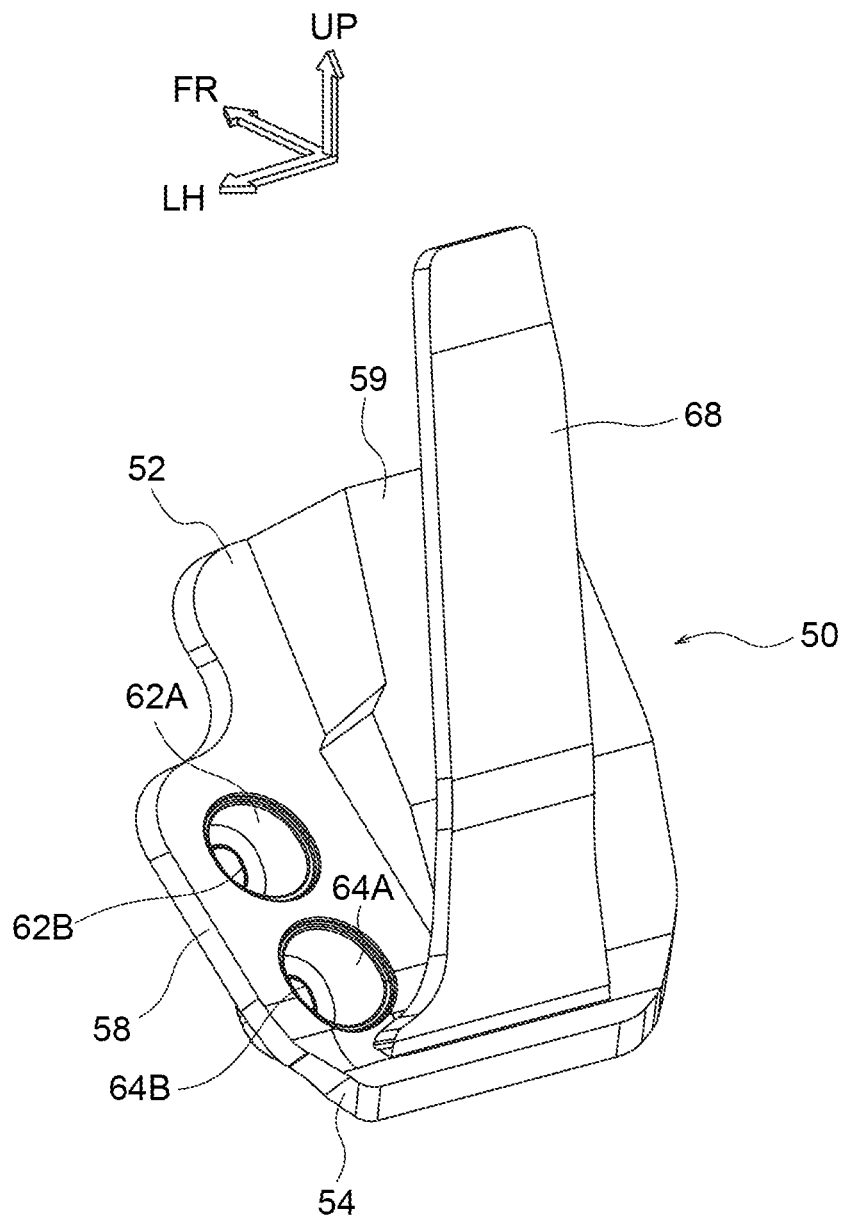
FIG. 3 is a perspective view of an accelerator pedal device that is a portion of the pedal device for a vehicle shown in FIG. 1.
Figure 4:
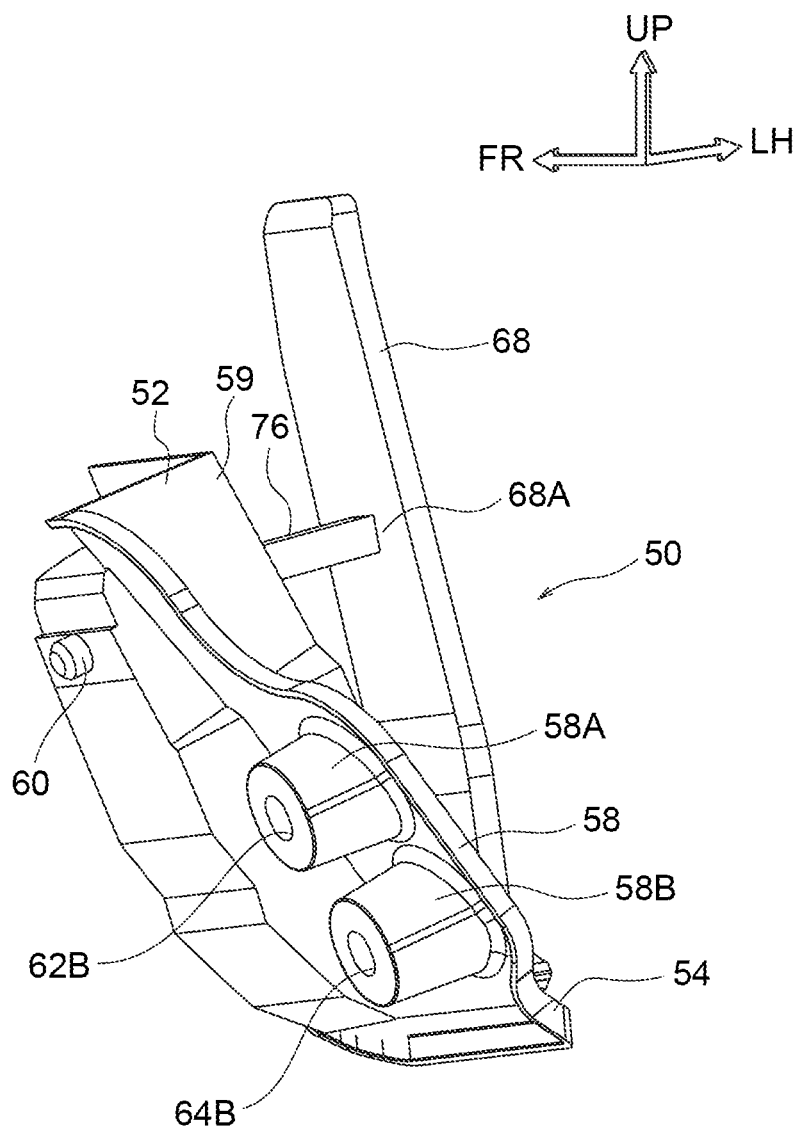
FIG. 4 is a perspective view of the accelerator pedal device shown in FIG. 3.

The fixed portion 58 is provided at the left side portion of the base member 52. As shown in FIG. 4, two projecting portions 58A, 58B that are lined-up in the longitudinal direction are provided so as to project-out at the lower surface of the fixed portion 58. As shown in FIG. 2, two concave portions 62A, 64A are formed in the positions, which respectively correspond to the projecting portions 58A, 58B, of the upper surface of the fixed portion 58. The cross-sectional shapes of the concave portions 62A, 64A are circular. Through-holes for fixing 62B, 64B, which pass through the bottom portions of the projecting portions 58A, 58B, are provided at the bottom surfaces of the concave portions 62A, 64A. As shown in FIG. 2 through FIG. 5, the through-holes for fixing 62B, 64B are both circular. The inner diameter of the through-hole for fixing 62B and the inner diameter of the through-hole for fixing 64B are the same as each other. As shown in FIG. 9, inner diameter D2 of each of the through-holes for fixing 62B, 64B is smaller than the inner diameters of the through-holes 34B, 34C and the concave portions 62A, 64A. Moreover, the inner diameter D2 of each of the through-holes for fixing 62B, 64B is greater than the inner diameter D1 of each of the reference holes 30A2, 34A that are provided in the upper plate portion 30A1 and the bracket 34.

Figure 12:
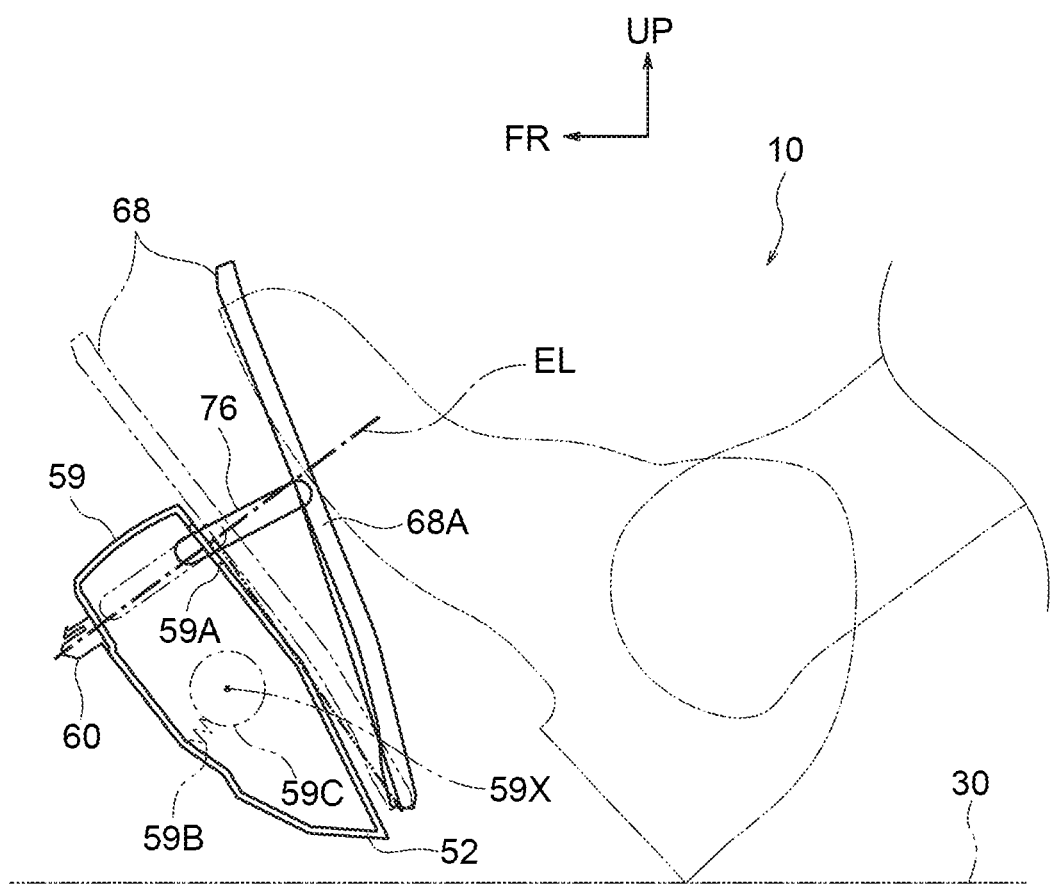
FIG. 12 is a schematic cross-sectional view, which is cut along a plane orthogonal to the vehicle width direction, of the accelerator pedal device shown in FIG. 3.

The base member 52 includes the case portion 59 that is hollow and that is the region that is positioned at the right side of the fixed portion 58. The upper surface of the case portion 59 is positioned further toward the upper side than the upper surface of the fixed portion 58. As shown in FIG. 1 and FIG. 12, a through-hole 59A, which passes through the ceiling plate portion of the case portion 59, is formed in the upper surface of the case portion 59. As shown in FIG. 12, a spring 59B, a rotating body (moving body) 59C, and an encoder (not illustrated) that detects the rotation angle of the rotating body 59C are provided at the interior space of the case portion 59. The rotating body 59C can rotate around its own axis 59X.

Figure 5:
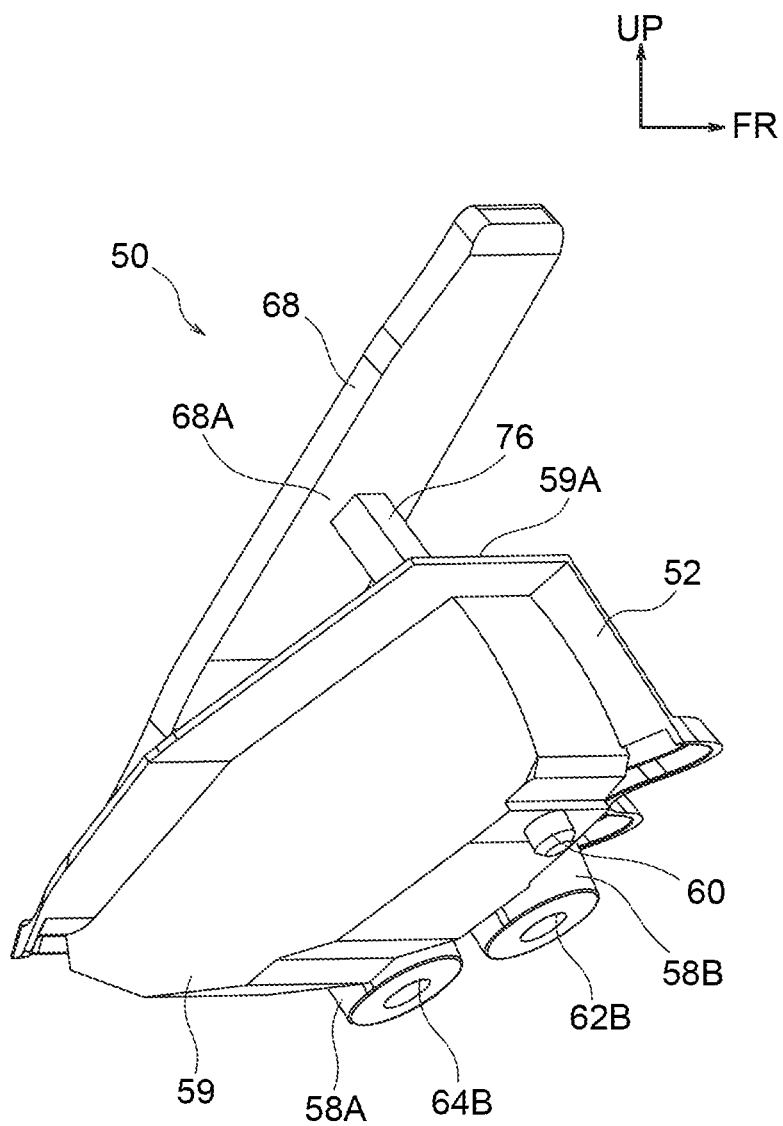
FIG. 5 is a perspective view of the accelerator pedal device shown in FIG. 3.

As shown in FIG. 4 and FIG. 5, the upper end portion of the reference pin 60 is supported by the front end portion of the lower surface of the case portion 59. As shown in FIG. 6 and FIG. 7, the reference pin 60 includes a main body portion 60A and an elastically deforming portion 60B. Note that, in FIG. 2, FIG. 4 and FIG. 5, the shape of the reference pin 60 is drawn in a simplified manner for convenience. The main body portion 60A and the elastically deforming portion 60B are connected to each other at the upper end portions thereof. The lower end surface of the main body portion 60A is a tapered surface 60A1 whose center is a central axis 60X of the reference pin 60. The elastically deforming portion 60B can elastically deform in the radial direction of the reference pin 60. A retainer claw 60B1 is provided at the lower end portion of the elastically deforming portion 60B. When the elastically deforming portion 60B is in a free state (the state of FIG. 6), the outer diameter of the region of the reference pin 60, which is positioned further toward the upper side than the retainer claw 60B1, is D3. When the elastically deforming portion 60B is in a free state, the outer diameter of the reference pin 60 at the position passing through the upper end portion of the retainer claw 60B1 of the reference pin 60 is D4. The outer diameter D3 is smaller than the inner diameter D1 of each of the reference holes 30A2, 34A that are provided at the upper plate portion 30A1 and the bracket 34. On the other hand, the outer diameter D4 is greater than the inner diameter D1 of the reference holes 30A2, 34A and the outer diameter D3.

As described above, the lower end portion of the plate-shaped pedal pad 68 is rotatably connected to the supporting portion 54. The pedal pad 68 can rotate between an initial position that is shown in FIG. 1 and FIG. 12, and a maximum depressed position that is shown by the imaginary line in FIG. 12 and is positioned further toward the front side than the initial position. Moreover, due to the working of the stopper (not illustrated), the rotation of the pedal pad 68 in clockwise direction further than the initial position and rotation of the pedal pad 68 in counterclockwise direction further than the maximum depressed position are mechanically restricted in FIG. 1 and FIG. 12. The pedal pad 68 is the member that is stepped-on by the foot of the driver. A standard stepped-on region 68X is formed at a predetermined region of the pedal pad 68 (the region depicted by the one-dot chain line in FIG. 2). Moreover, as shown in FIG. 2, FIG. 4, FIG. 5 and FIG. 12, one end of a pushing member 76 is connected to the lower surface of the standard stepped-on region 68X. This standard stepped-on region 68X is prescribed by the Society of Automotive Engineers (SAE), and is the region of the accelerator pedal that is thought to be pushed by the ball of the foot of the driver who has a general physique (i.e., medium-sized build) (BOF: ball of foot).

As shown in FIG. 12, the lower portion of the pushing member 76 passes through the through-hole 59A and enters into the interior space of the case portion 59. Moreover, the lower end portion of the pushing member 76 is connected to the rotating body 59C inside the case portion 59. Further, the spring 59B, which is elastically deformed, always urges the rotating body 59C to rotate. The direction in which the spring 59B urges rotation is the direction of pushing the pedal pad 68 toward the initial position side via the rotating body 59C and the pushing member 76. When the pedal pad 68 rotates from the initial position toward the maximum depressed position side, the rotating body 59C rotates, and the amount of elastic deformation of the spring 59B increases. Thereupon, the encoder detects the amount of rotation of the rotating body 59C. Namely, the encoder detects the depressed amount of the pedal pad 68. Then, the encoder transmits a signal corresponding to the detected amount to a throttle valve actuator of the engine (the drive source) (not illustrated) that is provided in the engine room. Accordingly, the operated state of the engine is controlled due to the pedal pad 68 and the pushing member 76 moving. Note that the structures and operations of mechanisms including the pedal pad 68, the pushing member 76, the spring 59B, the rotating body 59C and the encoder are disclosed in JP-A No. 2019-96253 for example. Therefore, description of these structures and operations of JP-A No. 2019-96253 is incorporated by reference into the present specification by referencing JP-A No. 2019-96253.

At the time when the base member 52 is fixed to the supporting member 36 (the floor panel 30, the bracket 34), first, as shown in FIG. 6, the reference pin 60 that is positioned further toward the upper side (the rear side) than the bracket 34 is set coaxial to the reference hole 34A of the bracket 34 and the reference hole 30A2 of the pedestal portion 30A. Next, the reference pin 60 is moved toward the lower side (the front side) and is made to approach the reference holes 34A, 30A2. As described above, the outer diameter D4, at the position passing through the upper end portion of the retainer claw 60B1 of the reference pin 60 at the time when the elastically deforming portion 60B is in a free state, is greater than the inner diameter D1 of the reference hole 30A2 and the reference hole 34A. However, when, in the state in which a portion of the tapered surface 60A1 and a portion of the retainer claw 60B1 are contacting the peripheral edge portion of the reference hole 34A of the bracket 34, the reference pin 60 is pushed further toward the lower side (the front side), the elastically deforming portion 60B elastically deforms so as to approach the main body portion 60A. Therefore, the main body portion 60A and the elastically deforming portion 60B (the retainer claw 60B1) are inserted into the reference hole 30A2 and the reference hole 34A. As shown in FIG. 7, when the retainer claw 60B1 moves further toward the lower side than the upper plate portion 30A1, the elastically deforming portion 60B returns to the free state, and the upper end portion of the retainer claw 60B1, which is positioned further toward the outer peripheral side than the reference holes 30A2, 34A, opposes the lower surface of the upper plate portion 30A1. Moreover, the lower surface of the fixed portion 58 contacts the upper surface of the bracket 34.

Figure 8:
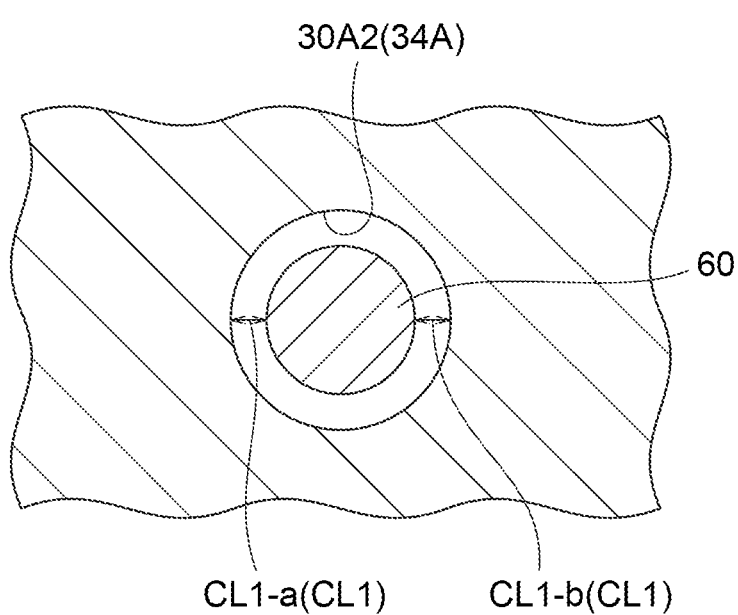
FIG. 8 is a cross-sectional view along arrow line 8-8 of FIG. 7.

As described above, the outer diameter D3 of the reference pin 60 is smaller than the inner diameter D1 of the reference holes 30A2, 34A. Therefore, as shown in FIG. 8, clearances are formed between the reference holes 30A2, 34A and a region of the reference pin 60. This region is positioned further toward the upper side than the retainer claw 60B1. For example, when the reference holes 30A2, 34A and the reference pin 60 are set substantially coaxial to one another, two clearances CL1-a, CL1-b are formed between the reference holes 30A2, 34A and the reference pin 60. First clearance CL1, which is the total of the two clearances CL1-a, CL1-b, is the clearance between the reference holes 30A2, 34A and the reference pin 60. However, this first clearance CL1 is extremely small. Therefore, the reference pin 60 substantially does not rattle with respect to the reference holes 30A2, 34A. Note that the first clearance CL1 is drawn in an exaggerated manner in FIG. 8 in order to make the disclosure easier to understand.

When the front portion of the base member 52 is mounted to the upper surface of the bracket 34 in this way, as shown in FIG. 1, the lower surfaces of the projecting portion 58A and the projecting portion 58B respectively contact the upper surface of the bracket 34 at two places. When, in the state in which the lower surfaces of the projecting portion 58A and the projecting portion 58B contact the upper surface of the bracket 34, the base member 52 is rotated relatively to the bracket 34 around the reference pin 60, the through-hole for fixing 62B and the through-hole for fixing 64B face the two through-holes 34B, 34C of the bracket 34, respectively (see FIG. 9).

Next, by using the bolt for fixing (shaft member for fixing) 78 and the bolt for fixing (shaft member for fixing) 80 that are shown in FIG. 9 and FIG. 10, the base member 52 is fixed to the supporting member 36 (the floor panel 30, the bracket 34). The bolt for fixing 78 and the bolt for fixing 80 are both made of metal. The bolt for fixing 78 and the bolt for fixing 80 have head portions 78A, 80A and shaft portions 78B, 80B, respectively. The shaft portion 78B of the bolt for fixing 78 can be inserted from the upper side into the through-hole for fixing 62B and the through-hole 34B of the bracket 34. The shaft portion 80B of the bolt for fixing 80 can be inserted from the upper side into the through-hole for fixing 64B and the through-hole 34C of the bracket 34.

The shaft portion 78B of the bolt for fixing 78 is inserted into the through-hole for fixing 62B and the through-hole 34B, and is screwed together with the weld nut 38. The shaft portion 80B of the bolt for fixing 80 is inserted into the through-hole for fixing 64B and the through-hole 34C, and is screwed together with the weld nut 40. However, at this time, as shown in FIG. 9, the head portion 78A is apart, toward the upper side, from the bottom surface of the concave portion 62A, and the head portion 80A is apart, toward the upper side, from the bottom surface of the concave portion 64A.

Figure 11:
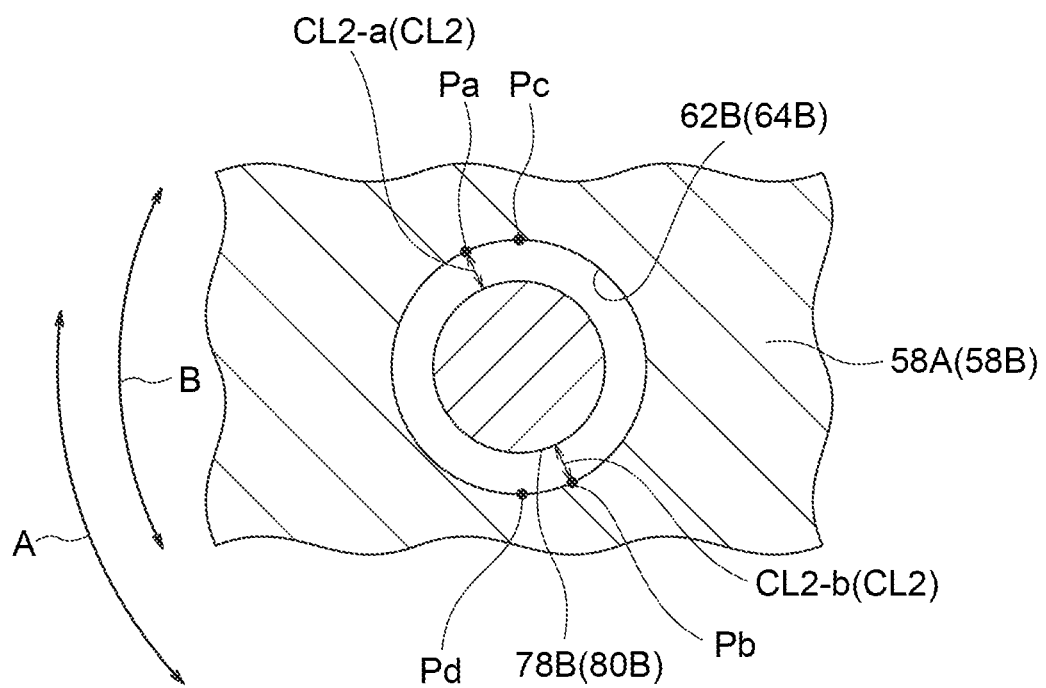
FIG. 11 is a cross-sectional view along arrow line 11-11 of FIG. 9.

As shown in FIG. 9, outer diameter D5 of the shaft portions 78B, 80B is smaller than the inner diameter D2 of each of the through-holes for fixing 62B, 64B. Therefore, clearances are formed between the through-holes for fixing 62B, 64B and the shaft portions 78B, 80B. For example, as shown in FIG. 11, when the through-hole for fixing 62B (the through-hole for fixing 64B) and the shaft portion 78B (the shaft portion 80B) are set substantially coaxial to one another, two clearances CL2-a, CL2-b are formed between the through-hole for fixing 62B (the through-hole for fixing 64B) and the shaft portion 78B (the shaft portion 80B). Second clearance CL2, which is the total of the two clearances CL2-a, CL2-b, is the clearance between the through-hole for fixing 62B (the through-hole for fixing 64B) and the shaft portion 78B (the shaft portion 80B). This second clearance CL2 is larger than the first clearance CL1. Therefore, the base member 52 (the through-holes for fixing 62B, 64B) can rotate relatively with respect to the shaft portions 78B, 80B in the circumferential direction (arrows A in FIG. 2 and FIG. 11 denote the circumferential direction) that is centered on the reference pin 60, within the range of the second clearance CL2.

As shown in FIG. 10, after the relative positions of the through-holes for fixing 62B, 64B with respect to the shaft portions 78B, 80B are determined, the shaft portions 78B, 80B are screwed together with the weld nuts 38, 40 until the head portion 78A press-contacts the bottom surface of the concave portion 62A and the head portion 80A press-contacts the bottom surface of the concave portion 64A. Due thereto, the base member 52 is fixed to the supporting member 36 (the floor panel 30, the bracket 34).

When the base member 52 is fixed to the supporting member 36, as shown in FIG. 2, the pedal pad 68 is positioned at the right side of the brake pedal pad 24 as seen in a rear view (plan view). Moreover, the brake pedal pad 24 that is positioned at the initial position and the pedal pad 68 that is positioned at the initial position are in the positional relationship shown in FIG. 1, as seen in the vehicle width direction. Moreover, extension line EL (see FIG. 1, FIG. 2 and FIG. 12), which extends along the extending direction of the axis of the reference pin 60, intersects the standard stepped-on region 68X of the pedal pad 68. Moreover, as shown in FIG. 1, the extension line EL overlaps with the brake pedal pad 24 when viewed in the vehicle width direction.

(Operation and Effects)

Operation and effects of the present embodiment are described next.

In the pedal device 10 of the present embodiment, the reference pin 60 substantially does not rattle with respect to the reference holes 30A2, 34A. Therefore, when the base member 52 is not fixed to the supporting member 36 by the bolts for fixing 78, 80 as shown in FIG. 9, the base member 52 can rotate relatively to the supporting member 36 within the range of the second clearance CL2, around the reference pin 60, which is inserted into the reference holes 30A2, 34A.

For example, when, as shown in FIG. 11, the base member 52 is fixed to the supporting member 36 by the bolts for fixing 78, 80 in the state in which the shaft portion 78B (the shaft portion 80B) is set substantially coaxial to the through-hole for fixing 62B (the through-hole for fixing 64B), the position of the pedal pad 68 is the position shown by the solid line in FIG. 2. Further, when the base member 52 is fixed to the supporting member 36 by the bolts for fixing 78, 80 in the state in which the shaft portion 78B (the shaft portion 80B) contacts region Pa (see FIG. 11) that is a portion of the inner peripheral surface of the through-hole for fixing 62B (the through-hole for fixing 64B), the pedal pad 68 is positioned at the position shown by the imaginary line in FIG. 2 (the position of reference numeral 68A). Further, when the base member 52 is fixed to the supporting member 36 by the bolts for fixing 78, 80 in the state in which the shaft portion 78B (the shaft portion 80B) contacts region Pb (see FIG. 11) that is a portion of the inner peripheral surface of the through-hole for fixing 62B (the through-hole for fixing 64B), the pedal pad 68 is positioned at the position shown by the imaginary line in FIG. 2 (the position of reference numeral 68B). Therefore, when a plurality of the base members 52 are fixed to a plurality of the supporting members 36 respectively, there is the possibility that dispersion will arise in the relative positions of the respective pedal pads 68 with respect to the respective supporting members 36.

However, the extension line EL that extends along the axis of the reference pin 60 intersects the pedal pad 68 (the standard stepped-on region 68X) that is not being depressed by the foot of the driver. Therefore, even if the base member 52 is rotated relative to the supporting member 36 within the range of the second clearance CL2, the position of the region (the standard stepped-on region 68X), which intersects the extension line EL, of the reference pin 60 is substantially unchanged. Accordingly, if the reference pin 60 is provided at the base member 52 such that the extension line EL passes-through the standard stepped-on region 68X of the pedal pad 68, the relative position, with respect to the supporting member 36, of the standard stepped-on region 68X at the time when the base member 52 is fixed to the supporting member 36 is not offset greatly from the designed position. Therefore, the base member 52 can be fixed to the supporting member 36 such that the driver can easily operate the pedal pad 68.

Figure 13:
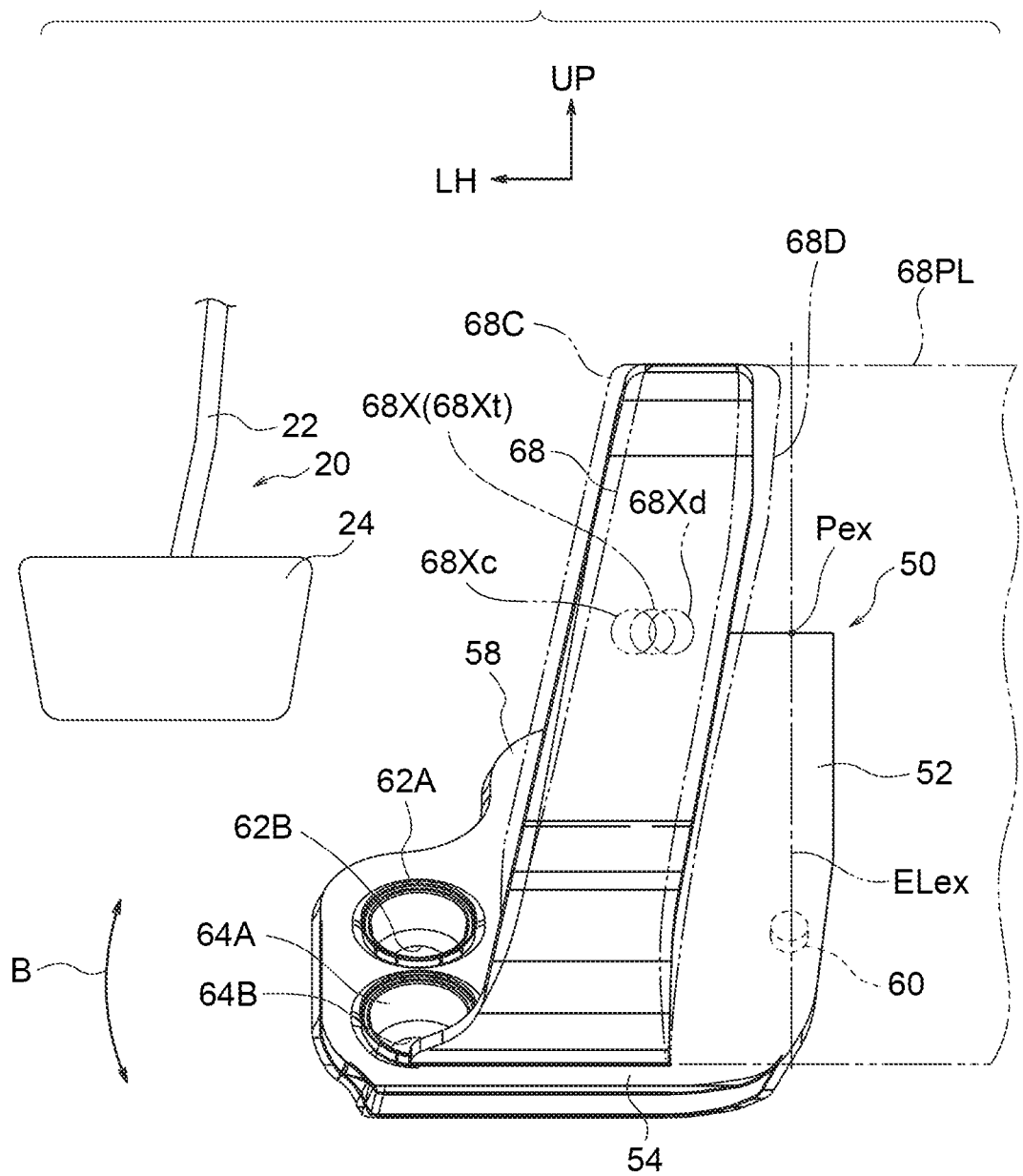
FIG. 13 is a rear view of a pedal device for a vehicle of a comparative example.

On the other hand, a comparative example of the present disclosure is shown in FIG. 13. This comparative example differs from the above-described embodiment with regard to the points that the reference pin 60 is provided at the right end portion of the lower surface of the base member 52, and the reference hole 30A2 of the pedestal portion 30A and the reference hole 34A of the bracket 34 (not illustrated in FIG. 13) are provided at a position corresponding to the reference pin 60.

When the reference pin 60 is inserted into the reference holes 30A2, 34A, and the base member 52 is fixed to the supporting member 36 by the bolts for fixing 78, 80, the brake pedal pad 24 that is positioned at the initial position and the pedal pad 68 that is positioned at the initial position are in the positional relationship shown in FIG. 13, as seen in a rear view (plan view). Moreover, extension line ELex, which extends along the axis of the reference pin 60, does not intersect the pedal pad 68 that is positioned at the initial position. Here, as shown in FIG. 13, an imaginary plane (the imaginary plane on which the pedal pad 68 is positioned) which is formed by extending the pedal pad 68 in the vehicle width direction is defined as an imaginary extension plane 68PL. In this case, the extension line ELex and the imaginary extension plane 68PL intersect at intersection point Pex that is positioned further toward the right side than the pedal pad 68. As is clear from FIG. 13, the intersection point Pex is apart from the pedal pad 68.

In the comparative example, in the state in which the head portion 78A and the head portion 80A are apart from the fixed portion 58 toward the upper side, the through-holes for fixing 62B, 64B can rotate relative to the shaft portions 78B, 80B in the circumferential direction (the direction of arrows B in FIG. 11 and FIG. 13), which is centered on the reference pin 60 (the reference holes 30A2, 34A), within the range of the second clearance CL2. Therefore, in the comparative example, the position of the intersection point Pex hardly changes at all, regardless of the position of the relative position of the base member 52 with respect to the supporting member 36.

For example, as shown in FIG. 11, the base member 52 is fixed to the supporting member 36 by the bolts for fixing 78, 80 in a state in which the shaft portion 78B (the shaft portion 80B) is set to be substantially coaxial to the through-hole for fixing 62B (the through-hole for fixing 64B). In this case, the position of the pedal pad 68 of the comparative example is the position shown by the solid line in FIG. 13. At this time, the standard stepped-on region 68X is positioned at the position denoted by reference numeral 68Xt. The position denoted by reference numeral 68Xt is the designed position of the standard stepped-on region 68X in the comparative example.

On the other hand, when the base member 52 is fixed to the supporting member 36 by the bolts for fixing 78, 80 in the state in which the shaft portion 78B (the shaft portion 80B) contacts region Pc (see FIG. 11) that is a portion of the inner peripheral surface of the through-hole for fixing 62B (the through-hole for fixing 64B), the pedal pad 68 is positioned at the position shown by the imaginary line in FIG. 13 (the position of reference numeral 68C). At this time, the standard stepped-on region 68X is positioned at the position shown by reference numeral 68Xc in FIG. 13.

Further, when the base member 52 is fixed to the supporting member 36 by the bolts for fixing 78, 80 in the state in which the shaft portion 78B (the shaft portion 80B) contacts region Pd (see FIG. 11) that is a portion of the inner peripheral surface of the through-hole for fixing 62B (the through-hole for fixing 64B), the pedal pad 68 is positioned at the position shown by the imaginary line shown in FIG. 13 (the position of reference numeral 68D). At this time, the standard stepped-on region 68X is positioned at the position shown by reference numeral 68Xd in FIG. 13.

In this way, in the comparative example as well, when a plurality of the base members 52 are fixed to a plurality of the supporting members 36 respectively, there is the possibility that dispersion will arise in the relative positions of the respective pedal pads 68 with respect to the respective supporting members 36. Further, in the comparative example, there is the concern that the relative position, with respect to the supporting member 36, of the standard stepped-on region 68X at the time when the base member 52 is fixed to the supporting member 36 will be offset greatly from the designed position. Therefore, it is not easy to fix the base member 52 to the supporting member 36 such that it is easy for the driver to operate the pedal pad 68.

Moreover, in the pedal device 10 of the present embodiment, when viewed in the vehicle width direction, the extension line EL overlaps with the brake pedal pad 24 which is not being depressed by the driver. Therefore, the driver can easily operate the pedal pad 68 and the brake pedal pad 24 by one foot.

Further, the reference pin 60 of the pedal device 10 of the present embodiment can easily be inserted into the reference hole 34A of the bracket 34 and the reference hole 30A2 of the pedestal portion 30A. Moreover, because the reference pin 60 includes the retainer claw 60B1, there is hardly any concern that the reference pin 60 will unintentionally come out of the reference holes 34A, 30A2 after the reference pin 60 has been inserted into the reference holes 34A, 30A2.

Moreover, the reference pin 60 is integrated with the case portion 59. Therefore, the base member 52 of the present embodiment can be manufactured easily and with a small number of parts, as compared with a case in which the case portion 59 and the reference pin 60 are manufactured separately, and, thereafter, the reference pin 60 is fixed to the case portion 59.

Further, when the driver applies force to the standard stepped-on region 68X of the pedal pad 68 by his/her foot, this force is transmitted efficiently from the standard stepped-on region 68X to the rotating body 59C. Therefore, due to the driver pushing the standard stepped-on region 68X by his/her foot, the operation state of the engine can be controlled by a small force.

The pedal device 10 according to the present embodiment has been described above. However, the design of the pedal device 10 can be changed appropriately within a scope that does not depart from the gist of the present disclosure. Note that, in the following description, members of structures that are the same as those of the above-described present embodiment are denoted by the same reference numerals only, and detailed description thereof is omitted.

First Modified Example

Figure 14:
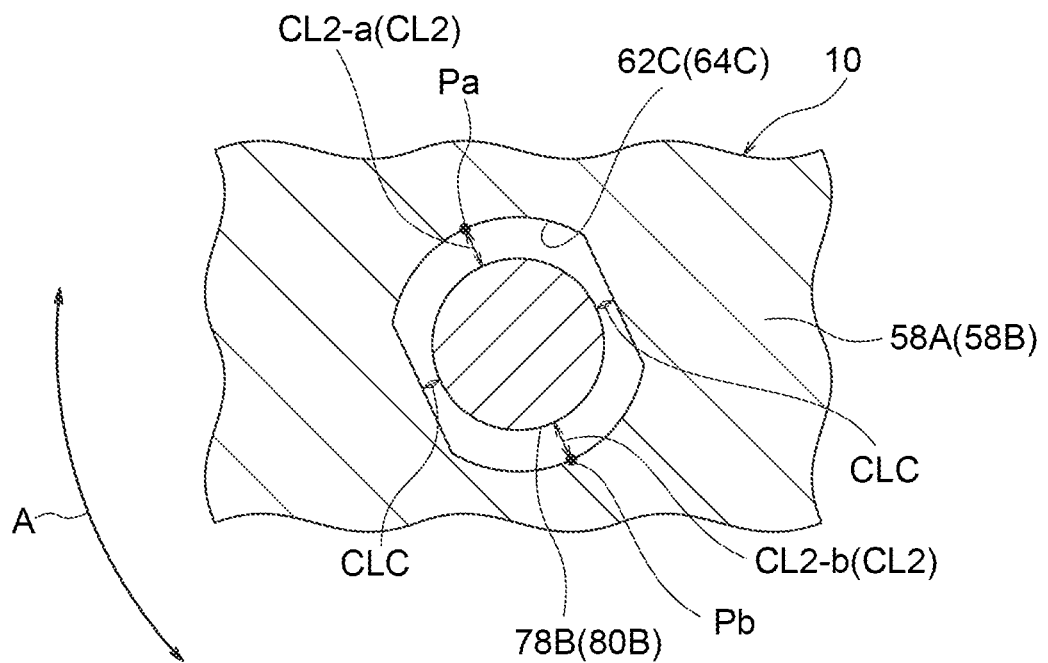
FIG. 14 is a cross-sectional view, corresponding to FIG. 11, of a first modified example.

In the pedal device 10 of the first modified example that is shown in FIG. 14, a through-hole for fixing 62C and a through-hole for fixing 64C that are formed in the projecting portions 58A, 58B are not round holes, and are elongated holes. The longitudinal directions of the through-holes for fixing 62C, 64C are directions that extend along the circumferential direction (the arrow A direction in FIG. 14) whose center is the reference pin 60.

In this first modified example, the second clearance CL2 that extends along the aforementioned circumferential direction (the arrow A direction) is formed between the through-hole for fixing 62C (the through-hole for fixing 64C) that is an elongated hole and the shaft portion 78B (the shaft portion 80B). When such a second clearance CL2 is formed, clearance CLC (see FIG. 14), which extends in the direction orthogonal to the aforementioned circumferential direction and is formed between the through-hole for fixing 62C (the through-hole for fixing 64C) and the shaft portion 78B (the shaft portion 80B), can be made to be smaller than the second clearance CL2. Accordingly, the areas of the through-holes for fixing 62C, 64C that are elongated holes can be made to be smaller than the areas of the through-holes for fixing 62B, 64B that are round holes. Therefore, in a case in which the through-holes for fixing 62C, 64C that are elongated holes are formed in the base member 52, the mechanical strength of the base member 52 is high as compared with a case in which the through-holes for fixing 62B, 64B that are round holes are formed in the base member 52.

Second Modified Example

Figure 15:
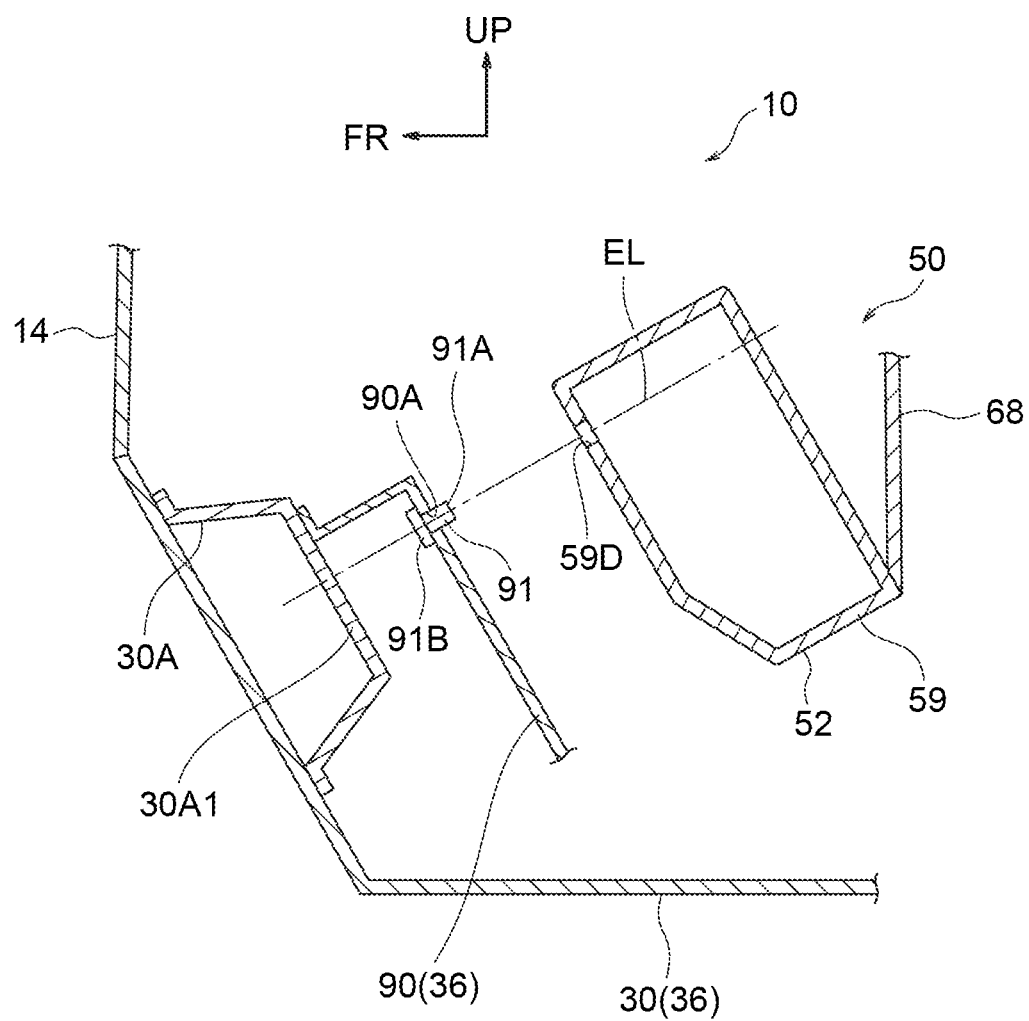
FIG. 15 is a cross-sectional view, which is cut along a plane orthogonal to the vehicle width direction, of the accelerator pedal device and the supporting member, which are apart from one another, of a second modified example.

A bracket 90, which is made of metal and has a shape that is different than that of the bracket 34, is fixed to the upper plate portion 30A1 of the pedestal portion 30A of the pedal device 10 of a second modified example that is shown in FIG. 15. The bracket 90 is a structural element of the supporting member 36. A mounting hole 90A is provided in the bracket 90. A reference pin (reference shaft member) 91 is mounted to the mounting hole 90A. The reference pin 91 that is made of metal includes a shaft portion 91A that is solid cylindrical, and a head portion 91B that is disc-shaped and that has a greater diameter than the shaft portion 91A. The shaft portion 91A is inserted into the mounting hole 90A from the lower side, and the head portion 91B is fixed to the bracket 90. The upper portion of the shaft portion 91A projects-out from the bracket 90 toward the upper side.

A reference hole 59D that is round is formed in the lower surface of the case portion 59. The shaft portion 91A of the reference pin 91 has a smaller diameter than the reference hole 59D. When the shaft portion 91A is inserted into the reference hole 59D, the first clearance CL1 (not illustrated in FIG. 15) is formed between the shaft portion 91A and the inner peripheral surface of the reference hole 59D. Moreover, when the shaft portion 91A is inserted into the reference hole 59D, the lower surface of the case portion 59 contacts the upper surface of the bracket 90, and the extension line EL of the reference pin 91 intersects the standard stepped-on region 68X (not illustrated in FIG. 15) of the pedal pad 68.

Therefore, in the second modified example as well, the base member 52 can be fixed to the supporting member 36 (the floor panel 30, the bracket 90) such that the relative position of the standard stepped-on region 68X with respect to the supporting member 36 is not greatly offset from the designed position.

Third Modified Example

Figure 16:
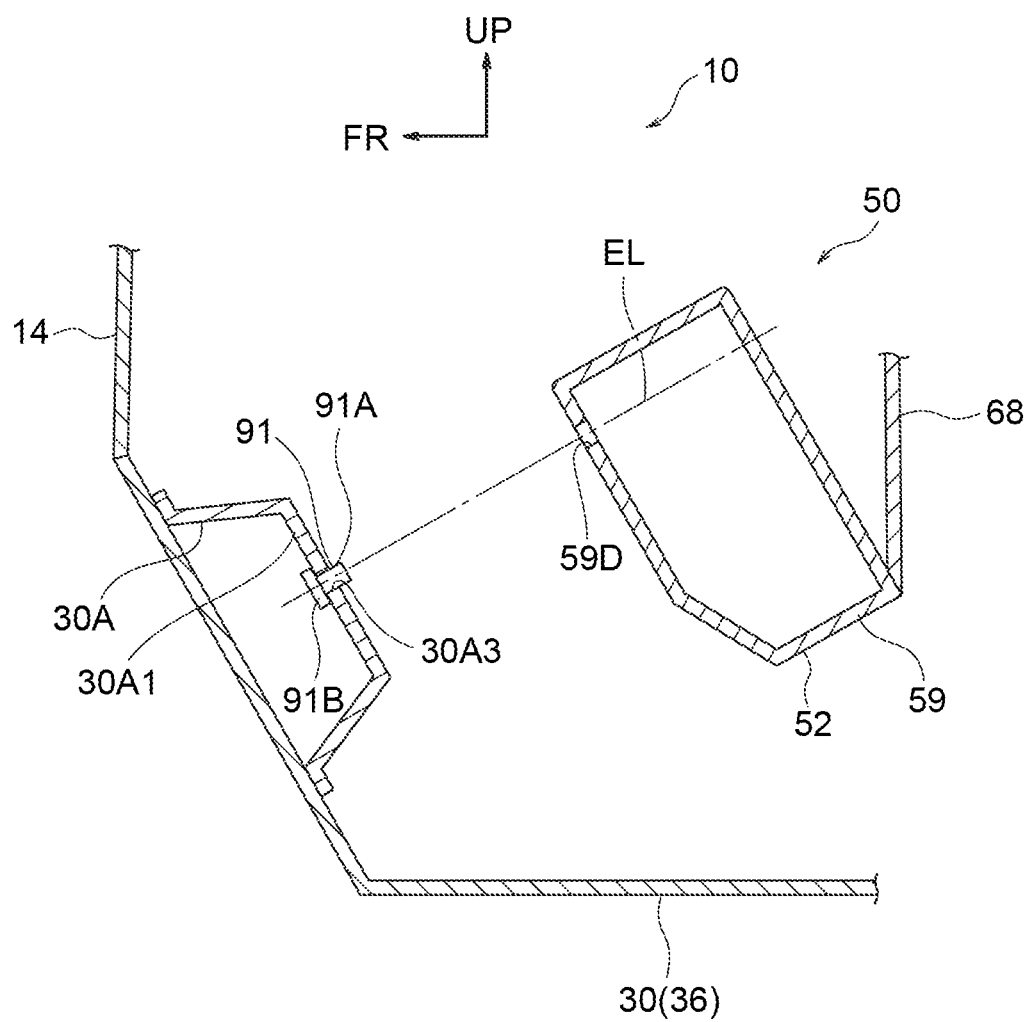
FIG. 16 is a cross-sectional view, which is cut along a plane orthogonal to the vehicle width direction, of the accelerator pedal device and the supporting member, which are apart from one another, of a third modified example.

The supporting member 36 of the pedal device 10 of the third modified example that is shown in FIG. 16 does not have the bracket 34. A mounting hole 30A3 is formed in the upper plate portion 30A1 of the pedestal portion 30A. The shaft portion 91A of the reference pin 91 is inserted into the mounting hole 30A3 from the lower side, and the head portion 91B is fixed to the upper plate portion 30A1. The upper portion of the shaft portion 91A projects-out from the upper plate portion 30A1 toward the upper side.

The reference hole 59D that is round is formed in the lower surface of the case portion 59. When the shaft portion 91A is inserted into the reference hole 59D, the first clearance CL1 (not illustrated in FIG. 16) is formed between the shaft portion 91A and the inner peripheral surface of the reference hole 59D. Moreover, when the shaft portion 91A is inserted into the reference hole 59D, the lower surface of the case portion 59 contacts the upper surface of the upper plate portion 30A1, and the extension line EL of the reference pin 91 intersects the standard stepped-on region 68X (not illustrated in FIG. 16) of the pedal pad 68.

Therefore, in the third modified example as well, the base member 52 can be fixed to the supporting member 36 (the floor panel 30) such that the relative position of the standard stepped-on region 68X with respect to the supporting member 36 is not greatly offset from the designed position.

Fourth Modified Example

Figure 17:
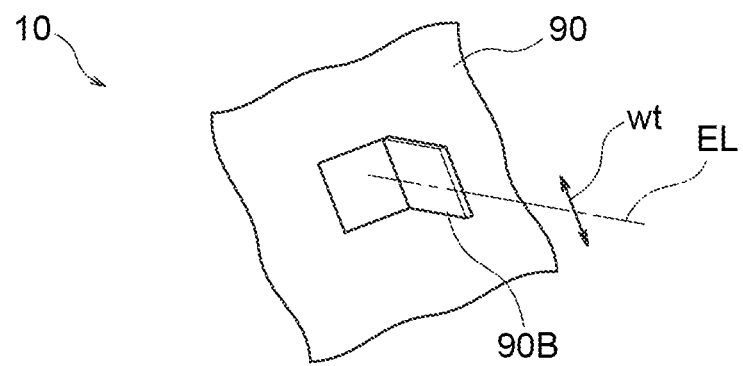
FIG. 17 is a schematic perspective view of a bracket of a fourth modified example.
Figure 18:
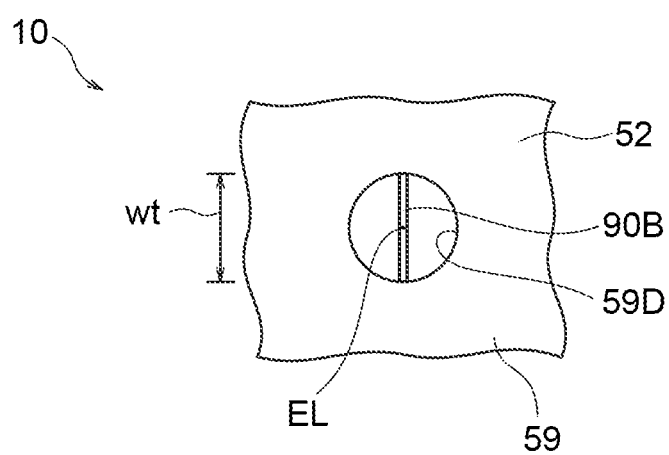
FIG. 18 is a schematic view showing a situation in which a reference projection of the bracket of the fourth modified example is inserted into a reference hole of the base member.

The basic structure of the pedal device 10 of a fourth modified example that is shown in FIG. 17 and FIG. 18 is the same as that of the second modified example. However, the pedal device 10 of the fourth modified example does not have the reference pin 91, and the mounting hole 90A is not formed in the bracket 90. Instead, a reference projection (reference shaft member) 90B that is substantially rectangular is formed in the bracket 90 of the fourth modified example by a portion of the bracket 90 being cut and bent-up. As shown in FIG. 17, the extension line EL, which passes-through the interior of the reference projection 90B and extends in the extending direction of the reference projection 90B (the direction in which the cut portion has been bent), is parallel to the extension line EL of the reference pin 91. Moreover, width wt of the reference projection 90B is the same as the outer diameter D3 of the region of the reference pin 60, this region being positioned further toward the upper side than the retainer claw 60B1 in the above-described embodiment.

As shown in FIG. 18, when the reference projection 90B is inserted into the reference hole 59D that is formed in the lower surface of the case portion 59, the first clearance CL1 (not illustrated in FIG. 18) is formed between the both side surfaces of the reference projection 90B and the inner peripheral surface of the reference hole 59D. Moreover, when the reference projection 90B is inserted into the reference hole 59D, the lower surface of the case portion 59 contacts the upper surface of the bracket 90, and the extension line EL of the reference projection 90B intersects the standard stepped-on region 68X (not illustrated in FIGS. 17, 18) of the pedal pad 68.

Therefore, in the fourth modified example as well, the base member 52 can be fixed to the supporting member 36 (the floor panel 30, the bracket 90) such that the relative position of the standard stepped-on region 68X with respect to the supporting member 36 is not greatly offset from the designed position.

Fifth Modified Example

Figure 19:
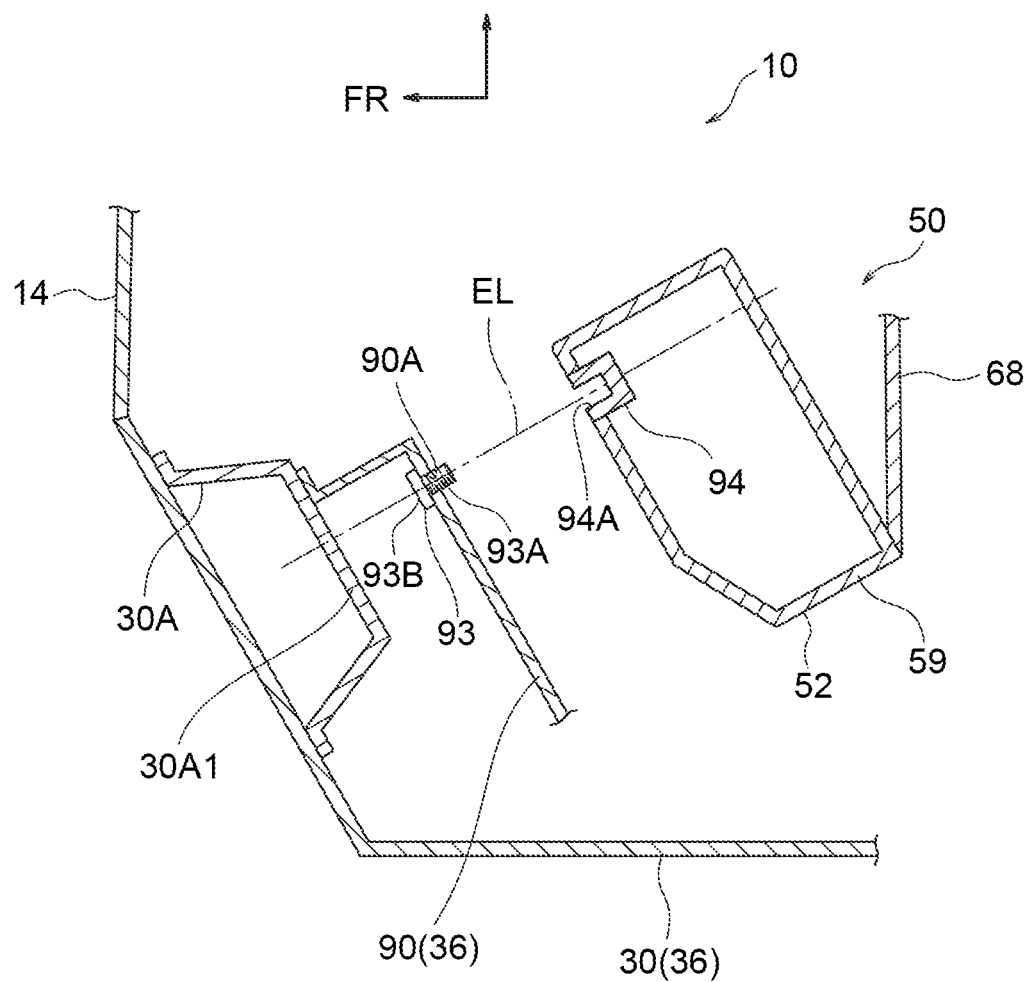
FIG. 19 is a cross-sectional view, which is cut along a plane orthogonal to the vehicle width direction, of the accelerator pedal device and the supporting member, which are apart from one another, of a fifth modified example.
Figure 20:
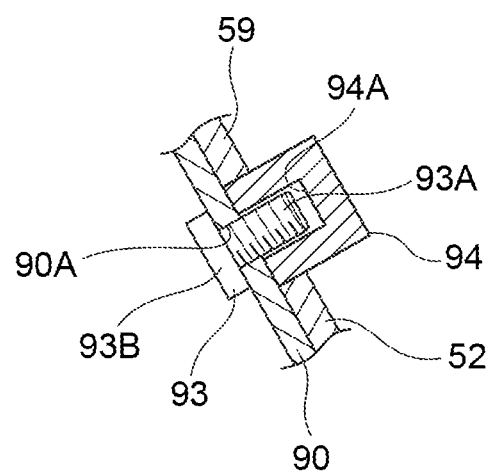
FIG. 20 is a cross-sectional view of the base member, the supporting member, the reference bolt and the receiving member when the reference bolt is inserted into the receiving member, of a fifth modified example.

The basic structure of the pedal device 10 of a fifth modified example that is shown in FIG. 19 and FIG. 20 is the same as that of the second modified example. However, the pedal device 10 of the fifth modified example does not have the reference hole 59D and the reference pin 91. Instead, the pedal device 10 of the fifth modified example includes a reference bolt (reference shaft member) 93 and a receiving member 94.

The reference bolt (reference shaft member) 93 that is made of metal includes a screw portion 93A that is solid cylindrical, and a head portion 93B that is disc-shaped and whose diameter is greater than that of the screw portion 93A.

The receiving member 94, which is shaped as a cylindrical tube and whose lower surface is open, is fixed to the lower surface of the case portion 59. The lower surface of the receiving member 94 is exposed at the lower surface of the case portion 59. For example, a member in which the base member 52 and the receiving member 94 are made integral is obtained by carrying out insert molding in a state in which the receiving member 94 is disposed at the interior of a molding die (not illustrated). The receiving member 94 is made of resin. The inner diameter of a reference hole 94A, which is cylindrical and is formed in the bottom surface of the receiving member 94, is greater than the outer diameter of the screw portion 93A. Moreover, a female screw groove (not illustrated) is formed in the inner peripheral surface of the reference hole 94A.

The screw portion 93A of the reference bolt 93 is inserted into the mounting hole 90A from the lower side of the bracket 90, and the head portion 93B is fixed to the bracket 90. The upper portion of the screw portion 93A projects-out toward the upper side from the bracket 90. The upper portion of the screw portion 93A is inserted into the reference hole 94A while rotating relatively, up until the lower surface of the case portion 59 contacts the upper surface of the bracket 90. Due thereto, a male screw portion of the screw portion 93A is screwed together with the female screw groove of the reference hole 94A, and the first clearance CL1 (not illustrated) is formed between the screw portion 93A and the reference hole 94A. Moreover, the extension line EL of the screw portion 93A intersects the standard stepped-on region 68X (not illustrated in FIG. 19 and FIG. 20) of the pedal pad 68.

In the fifth modified example, the base member 52 (the case portion 59) can rotate relative to the bracket 90 (the reference bolt 93) around the extension line EL. Therefore, in the fifth modified example as well, the base member 52 can be fixed to the supporting member 36 (the floor panel 30, the bracket 90) such that the relative position of the standard stepped-on region 68X with respect to the supporting member 36 is not greatly offset from the designed position.

Sixth Modified Example

Figure 21:
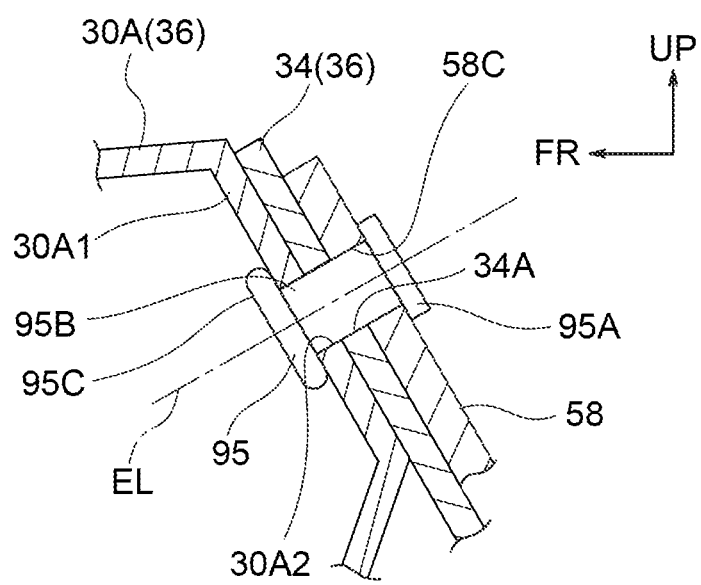
FIG. 21 is a cross-sectional view, corresponding to FIG. 7, of a sixth modified example.

The pedal device 10 of the sixth modified example shown in FIG. 21 includes a rivet 95 as the reference shaft member instead of the reference pin 60, the reference projection 90B, the reference pin 91 and the reference bolt 93. Moreover, a through-hole 58C is formed in the fixed portion 58. The rivet 95 is inserted into the through-hole 58C and the reference holes 34A, 30A2 that have been set to be coaxial to one another. The rivet 95 includes a head portion 95A that is the upper end portion thereof, and a shaft portion 95B that is solid cylindrical and has a smaller diameter than the head portion 95A. The head portion 95A faces the upper surface of the fixed portion 58, and the shaft portion 95B passes-through the through-hole 58C and the reference holes 34A, 30A2 downwardly from the upper side. Due to the lower end portion of the shaft portion 95B being plastically deformed, this lower end portion becomes a crimped portion 95C whose diameter is greater than that of the reference hole 30A2. The first clearance CL1 (not illustrated) is formed between the shaft portion 95B and the inner peripheral surfaces of the reference holes 34A, 30A2. The extension line EL of the shaft portion 95B intersects the standard stepped-on region 68X (not illustrated in FIG. 21) of the pedal pad 68.

In the sixth modified example, the base member 52 (the case portion 59) can rotate relative to the supporting member 36 around the extension line EL. Therefore, in the sixth modified example as well, the base member 52 can be fixed to the supporting member 36 such that the relative position of the standard stepped-on region 68X with respect to the supporting member 36 is not greatly offset from the designed position.

Rivets may be used as shaft members for fixing instead of the bolts for fixing 78, 80. In this case, the weld nuts 38, 40 are omitted from the bracket 34. Moreover, in the state in which the head portion that is provided at one end portion of the rivet press-contacts the bottom surface of the projecting portion 58A (58B), the crimped portion that is the other end portion of the rivet press-contacts the lower surface of the bracket 34.

In the above-described embodiment and respective modified examples, the numbers of the shaft members for fixing (bolts for fixing, rivets) and the through-holes for fixing that are formed in the base member 52 may be one or may be three or more.

In a case in which plural through-holes for fixing are provided, some of the through-holes for fixing only may be made to be elongated holes.

In the above-described embodiment, the case portion 59 and the reference pin 60 may be manufactured separately, and the reference pin 60 may be fixed to the case portion 59 after the both have been manufactured.

In the second modified example, the reference pin 91 may be provided at the base member 52, and a reference hole may be provided in the bracket 90.

In the third modified example, the reference pin 91 may be provided at the base member 52, and a reference hole may be provided in the floor panel 30.

In the fourth modified example, the bracket 90 may be omitted, and the reference projection 90B may be provided at the floor panel 30.

In the fourth modified example, the reference projection 90B may be provided at the base member 52, and a reference hole may be provided in the bracket 90.

In the fourth modified example, the reference projection 90B may be provided at the base member 52, and a reference hole may be provided in the floor panel 30.

In the fifth modified example, the receiving member 94 may be provided at the bracket 90, and a bolt that is fixed to the base member 52 may be inserted into the reference hole 94A of the receiving member 94.

In the fifth modified example, the receiving member 94 may be provided at the floor panel 30, and a bolt that is fixed to the base member 52 may be inserted into the reference hole 94A of the receiving member 94.

In the above-described embodiment and respective modified examples, the reference hole into which the reference pin is inserted may be a hole having a bottom. However, in this case, the reference pin does not include the retainer claw 60B1.

In the above-described embodiment and respective modified examples, the extension line EL may intersect a region, which is different than the standard stepped-on region 68X, of the pedal pad 68 that is positioned at the initial position.

The region corresponding to the dash panel 14 and the region corresponding to the floor panel 30 may be structured by a panel (not illustrated) that is an integrally molded component.

The drive source of the vehicle may be an electric motor and not an engine. Further, the vehicle may have an engine and an electric motor as the drive sources thereof.

What is claimed is:

1. A pedal device for a vehicle, comprising:
    a base member that is supported by a supporting member comprising at least one of a panel, which structures an inner wall of an interior space of the vehicle, or a bracket that is fixed to the panel; and
    an accelerator pedal pad of an organ accelerator pedal that is rotatably supported by the base member, wherein:
    a single reference hole is formed in one of the supporting member or the base member,
    at least one through-hole for fixing is formed in the base member,
    a reference shaft member, which is inserted into the single reference hole while forming a predetermined first clearance between the reference shaft member and an inner peripheral surface of the single reference hole and whose extension line, which extends along an extending direction of the reference shaft member, intersects the accelerator pedal pad, is supported by the other of the supporting member or the base member, and
    a shaft member for fixing, which is inserted into the at least one through-hole for fixing while forming a second clearance that is larger than the first predetermined clearance between the shaft member for fixing and an inner peripheral surface of the at least one through-hole for fixing, fixes the base member to the supporting member by being fixed to the supporting member.

2. The pedal device for a vehicle of claim 1, further comprising a suspended brake pedal that includes a brake pedal pad rotatably supported by the panel,
    wherein the extension line overlaps with the brake pedal pad when viewed in a vehicle width direction.

3. The pedal device for a vehicle of claim 1, wherein the reference shaft member comprises a reference pin that is inserted into the single reference hole.

4. The pedal device for a vehicle of claim 3, wherein the other of the supporting member or the base member and the reference pin are fixed to one another.

5. The pedal device for a vehicle of claim 4, wherein:
    the other of the supporting member or the base member is the base member, and
    the base member and the reference pin are an integrally molded component made of resin.

6. The pedal device for a vehicle of claim 3, wherein:
    the reference pin is supported by the base member,
    the single reference hole that is formed in the supporting member is a through-hole, and
    the reference pin includes a retainer claw that is configured to pass through the single reference hole from the base member side and that faces the base member while being positioned further toward an outer peripheral side than the single reference hole when having been passed through the single reference hole.

7. The pedal device for a vehicle of claim 1, wherein:
    the at least one through-hole for fixing is an elongated hole, and
    a longitudinal direction of the elongated hole is a direction that extends along a circumferential direction centered on the reference shaft member.

8. The pedal device for a vehicle of claim 1, comprising:
    a moving body that controls an operation state of a drive source of the vehicle by moving; and
    a pushing member that is provided at a surface, which is at a base member side of a predetermined region of the accelerator pedal pad, so as to extend toward the base member side, and that moves the moving body in conjunction with rotation of the accelerator pedal pad,
    wherein the extension line intersects the predetermined region.

* * * * *